(12) United States Patent
Heor et al.

(10) Patent No.: US 7,990,833 B2
(45) Date of Patent: Aug. 2, 2011

(54) OPTICAL PICKUP DEVICE WITH DIFFRACTION PATTERNS ON OBJECT LENS

(75) Inventors: Tae Youn Heor, Suwon-Si (KR); Soo Han Park, Yongin-Si (KR); Young Man Ahn, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1394 days.

(21) Appl. No.: 11/500,438

(22) Filed: Aug. 8, 2006

(65) Prior Publication Data

US 2007/0115525 A1    May 24, 2007

(30) Foreign Application Priority Data

Oct. 24, 2005    (KR) .......................... 10-2005-0100379

(51) Int. Cl.
*G11B 7/00* (2006.01)
(52) U.S. Cl. ......... 369/112.05; 369/112.03; 369/112.06; 369/112.08
(58) Field of Classification Search ............ 369/112.03, 369/112.05, 112.06, 112.07, 112.08, 112.11, 369/112.12, 112.13
See application file for complete search history.

(56) References Cited

U.S. PATENT DOCUMENTS

| | | | |
|---|---|---|---|
| 5,600,620 A | 2/1997 | Ohguri | |
| 7,268,947 B2 * | 9/2007 | Shiono et al. | 359/569 |
| 2005/0030878 A1 * | 2/2005 | Park et al. | 369/112.08 |
| 2005/0161579 A1 * | 7/2005 | Kim et al. | 250/201.5 |
| 2006/0072387 A1 * | 4/2006 | Schleipen | 369/44.19 |
| 2009/0016195 A1 * | 1/2009 | Arai et al. | 369/112.08 |

FOREIGN PATENT DOCUMENTS

| | | |
|---|---|---|
| JP | 10-312573 | 11/1998 |
| KR | 2005-74839 | 7/2005 |

* cited by examiner

*Primary Examiner* — Wayne R Young
*Assistant Examiner* — Latanya Bibbins
(74) *Attorney, Agent, or Firm* — Stanzione & Kim, LLP (57) ABSTRACT

An optical pickup device, which reduces the size of an optical spot formed on an optical disk, and prevents the degradation of a tracking error signal due to coherent light from a layer adjacent a target recording/reproducing layer of the optical disk. The optical pickup device includes a light source emitting light at a designated wavelength; an object lens concentrating the light incident from the light source thereupon and forming an optical spot on an optical disk having multiple recording layers; and an optical detector receiving the light reflected by the optical disk and detecting a data signal and an error signal, wherein at least one diffraction pattern region partially diffracting or intercepting the light, emitted from the light source and being incident upon the object lens, and the light, reflected by optical disk and being incident upon the object lens, is formed on the object lens.

26 Claims, 6 Drawing Sheets

OPTICAL PICKUP DEVICE WITH DIFFRACTION PATTERNS ON OBJECT LENS

CROSS-REFERENCE TO RELATED APPLICATIONS

This application claims the benefit of Korean Patent Application No. 2005-100379, filed Oct. 24, 2005, in the Korean Intellectual Property Office, the disclosure of which is incorporated herein by reference.

BACKGROUND OF THE INVENTION

1. Field of the Invention

Aspects of the present invention relate to an optical pickup device, and more particularly, to an optical pickup device, which reduces a size of an optical spot formed on a multilayer optical disk having a plurality of recording layers and prevents degradation of a tracking error signal due to a layer adjacent a target recording layer of the optical disk while the target recording layer is reproduced.

2. Description of the Related Art

An optical disk is a storage medium recording/reproducing data, such as sound, image, and documents, by changing reflection of laser light by pits formed on a surface of the optical disk. Types of optical disks include a Compact Disk (CD) and a Digital Versatile Disk (DVD). Recently, research in high-density recording media having an increased recording capacity as a new-generation optical disk has been vigorously carried out. These high-density optical disks include a Blu-ray Disk (BD) and an Advanced Optical Disk (AOD). Optical disks are recorded and reproduced by an optical recording/reproducing device using a laser light source having a varied wavelength and an object lens having a varied numerical aperture according to the amount of stored data.

For example, in the BD, which has a capacity higher than a capacity of the DVD, the wavelength of the light source is 405 nm, and the numerical aperture of the object lens is 0.65. In order to prevent degradation of performance of the BD due to an inclination of the BD, a thickness of the BD is approximately 0.1 mm.

Further, in order to increase the capacity of the optical disk, the BD employs a multilayer structure having a plurality of recording layers.

The recording capacity of the optical recording/reproducing device, which records data on an optical disk, serving as an optical data storage medium, using an optical spot obtained by concentrating laser light by an object lens, or reproduces the recorded data, is determined by the size of the optical spot. The size (S) of the optical spot may be expressed by equation (1):

$$S \propto k * \lambda / NA, \quad (1)$$

where: $\lambda$ is a wavelength of the laser light, NA is a numerical aperture of the object lens, and k is a constant in a range of 1 to 2, depending on an optical system.

Accordingly, in order to increase the density of an optical disk, the size (S) of an optical spot formed on the optical disk must be reduced. In order to reduce the size (S) of the optical spot, the wavelength ($\lambda$) of laser light is reduced or the numerical aperture (NA) of the object lens is increased, as described by the above equation.

In order to reduce the wavelength ($\lambda$) of the laser light, high-priced components are required. Further, where the numerical aperture (NA) of the object lens is increased, a depth of focus of the object lens is decreased in proportion to a square of the numerical aperture (NA), i.e., $NA^2$, and comma aberration of the object lens is increased in proportion to a cube of the numerical aperture (NA), i.e., $NA^3$. Accordingly, decreasing the wavelength and increasing the numerical aperture each has a limit in reducing the size (S) of the optical spot.

Where a multilayer optical disk having a plurality of recording layers, for example, a double layer optical disk having two recording layers, uses a Differential Push-Pull (DPP) method for detecting a tracking error signal, zero-order light reflected by an adjacent reproducing layer of a target reproducing layer overlaps with positive and negative first order-light reflected by the target reproducing layer, thereby causing degradation of a tracking error signal.

In order to address the above problem, Korean Patent Laid-open Publication No. 10-2005-0074839 discloses a separate optical member, particularly a polarizing hologram, which diffracts zero-order light reflected by an adjacent layer of a target layer so that the diffracted zero-order light is not received by first and second sub optical detectors. When the center of the polarizing hologram does not coincide with the optical axis of an object lens, the zero-order light reflected by the adjacent layer is partially incident on the first and second sub optical detectors, thereby exerting a negative influence on the quality of a tracking error signal.

SUMMARY OF THE INVENTION

An aspect of the invention is to provide an optical pickup device, which reduces a size of an optical spot formed on an optical disk by an object lens.

Another aspect of the invention is to provide an optical pickup device, which prevents degradation of a tracking error signal caused by the overlapping of zero-order light reflected by an adjacent reproducing layer of a target reproducing layer with positive and negative first-order light reflected by the target reproducing layer, when a multilayer optical disk having multiple recording layers is reproduced.

In accordance with one aspect, the present invention provides an optical pickup device comprising: a light source emitting light at a designated wavelength; an object lens concentrating the light incident from the light source thereupon and forming an optical spot on an optical disk having multiple recording layers; and an optical detector receiving the light reflected by the optical disk and detecting a data signal and an error signal, wherein at least one diffraction pattern region for partially diffracting or intercepting the light, emitted from the light source and being incident upon the object lens, and the light, reflected by the optical disk and being incident upon the object lens, is formed on the object lens.

The at least one diffraction pattern region may be formed at the central portion of the object lens.

The central axis of the at least one diffraction pattern region may coincide with the optical axis of the object lens.

The at least one diffraction pattern region may be formed on at least one of a convex surface of the object lens, upon which the light emitted from the light source is incident, and a flat surface of the object lens, upon which the light reflected by the optical disk is incident.

P-polarized and S-polarized light-intercepting diffraction patterns for intercepting both P-polarized light and S-polarized light may be formed on the at least one diffraction pattern region.

The P-polarized and S-polarized light-intercepting diffraction patterns for intercepting both P-polarized light and S-polarized light may be formed on one of the convex surface and the flat surface.

The P-polarized light-intercepting diffraction pattern for intercepting P-polarized light may be formed on one of the convex surface and the flat surface and the S-polarized light-intercepting diffraction pattern for intercepting S-polarized light may be formed on the other one of the convex surface and the flat surface.

The optical detector may comprise a main optical detector for receiving zero-order light reflected by the optical disk and first and second sub optical detectors for respectively receiving positive and negative first-order light reflected by the optical disk, and detect a tracking error signal by a Differential Push Pull (DPP) method.

Each diffraction pattern region may form a shape corresponding to the shape of the main optical detector and the first and second sub optical detectors so that the zero-order light reflected by an adjacent layer of a target recording/reproducing layer is not received by the main optical detector and the first and second sub optical detectors.

Each diffraction pattern region may have a designated shape so that the zero-order light reflected by an adjacent layer of a target recording/reproducing layer is not received by the main optical detector and the first and second sub optical detectors.

Each diffraction pattern region may have a large circular shape sufficient to cover the main optical detector and the first and second sub optical detectors.

A quarter wave plate may be installed on an optical path between the light source and the object lens.

Further, the quarter wave plate may be installed on an optical path between the object lens and the optical disk.

In accordance with another aspect, the present invention provides an optical pickup device comprising: a light source emitting light at a designated wavelength; a grating r branching the light emitted from the light source into zero-order light and positive and negative first-order light; an object lens concentrating the light incident from the light source thereupon and forming an optical spot on an optical disk having multiple recording layers; an optical detector receiving the light reflected by the optical disk and detecting a data signal and an error signal; and at least one diffraction pattern formed on the object lens partially diffracting or intercepting light incident upon the object lens so that the size of the optical spot formed on the optical disk is reduced smaller than a size of an optical spot in the optical diffraction limit and the zero-order light reflected by an adjacent layer of a target recording/reproducing layer of the optical disk does not influence detection regions of the optical detector.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
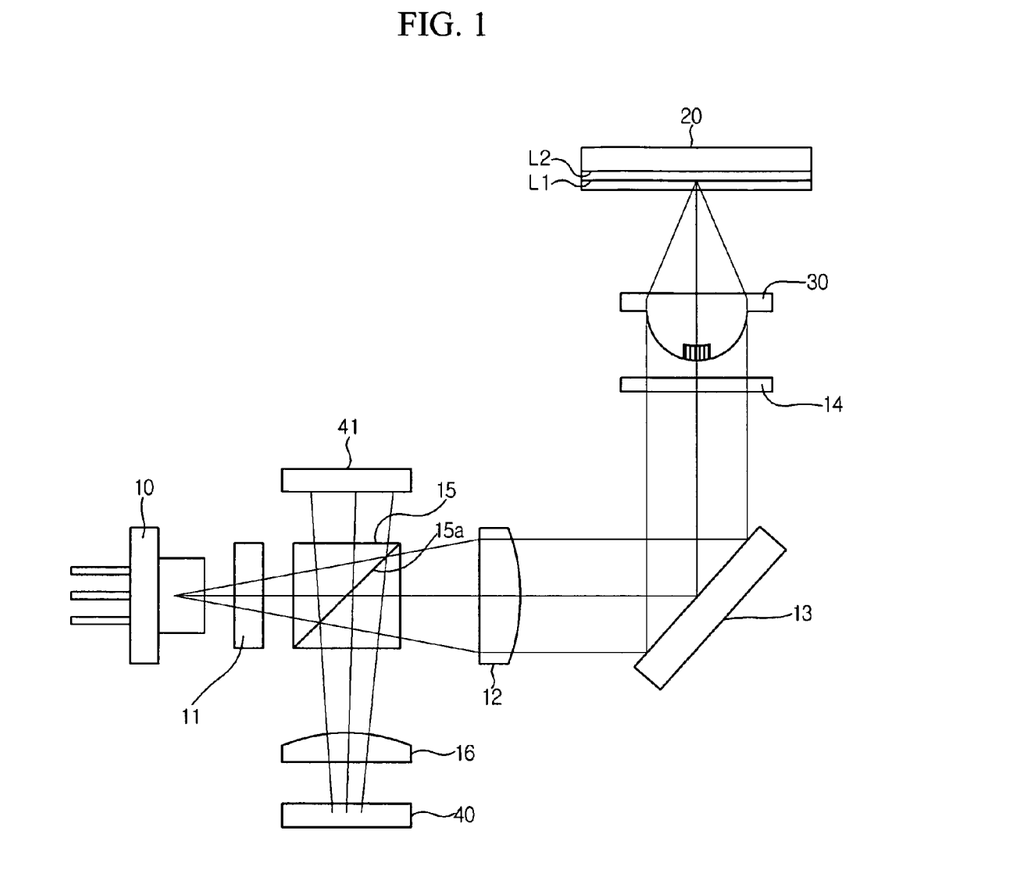
FIG. 1 is a schematic view illustrating an optical system of an optical pickup device in accordance with a first embodiment of the present invention.

As shown in FIG. 1, an optical pickup device in accordance with a first embodiment of the present invention comprises a light source 10 generating and emitting laser light having a proper wavelength according to a kind of an optical disk 20, an object lens 30 forming a spot by concentrating the laser light onto the optical disk 20 to record or reproduce data, a beam splitter 15 converting a path of the laser light, and an optical detector 40 receiving light reflected by the optical disk 20 to detect a data signal and an error signal. The object lens 30 is mounted on an actuator (not shown) for compensating for a focus and a tracking error.

A grating 11, branching the light emitted from the light source 10 into zero-order light (main light) and positive and negative first-order light (sub light) so that a tracking error signal can be detected by a differential push pull (DPP) method, is positioned between the light source 10 and the beam splitter 15. By branching the light emitted from the light source 10 into three beams by the above grating 11, a reproducing signal is obtained from a detecting signal of the zero-order light reflected by the optical disk 20, and a tracking error signal is obtained by calculating detecting signals of the zero-order light and the positive and negative first-order light reflected by the optical disk 20.

The beam splitter 15 guides the light emitted from the light source 10 towards the object lens 30, and guides the light reflected by the optical disk 20 towards to the optical detector 40. The light, which has been emitted from the light source 10 and passed thorough the beam splitter 15, is converted into parallel light by a collimating lens 12, and the path of the parallel light is changed by a reflecting mirror 13. Then, the light is incident upon the object lens 30. A quarter wave plate 14 changing the polarized light of the light incident upon the object lens 30 is formed between the reflecting mirror 13 and the object lens 30.

An astigmatism lens 16 generating astigmatism so as to detect a focus error signal by the astigmatism is provided between the beam splitter 15 and the optical detector 40, and a monitoring optical detector 41 receiving the light, having been emitted from the light source 10 and passed through the beam splitter 15, to monitor the output of the light source 10 is provided.

In the first embodiment, the light source 10 is designed such that the light source 10 emits light at a blue wavelength range, i.e., light at a wavelength of 405 nm, satisfying a BD standard, and the object lens 30 is designed such that the object lens 30 has a numerical aperture (NA) of 0.85 satisfying the BD standard. Further, the optical disk 20 is a BD having a multi-layered structure with multiple recording layers L1 and L2 so that the optical disk 20 has a high capacity.

However, the optical pickup device is not limited thereto, but may be designed such that the optical disk 20 is a DVD, the light source 10 emits light at a wavelength range satisfying a DVD standard, and the object lens 30 has a numerical aperture (NA) satisfying the DVD standard.

Where the light source 10 emits light at a blue wavelength range and the object lens 30 has a numerical aperture (NA) of 0.85, as described above, the optical pickup device in accordance with the first embodiment can record/reproduce a BD, which is a high-density optical disk.

The beam splitter 15 may be a polarizing beam splitter, which selectively transmits or reflects incident light according to a polarization of the light.

Where the optical pickup device comprises the polarizing beam splitter 15 and the quarter wave plate 14, as described above, when P-polarized light is emitted from the light source 11, the P-polarized light is transmitted by an incline plane 15a of the polarizing beam splitter 15 and is converted into circularly polarized light by the quarter wave plate 14, and the circularly polarized light is directed to the optical disk 20. Then, the circularly polarized light is reflected by the optical disk 20, and is converted into circularly polarized light having an opposite rotating direction, and the circularly polarized light is converted into S-polarized light by the quarter wave plate 14. The above S-polarized light is reflected by the incline plane 15a of the polarizing beam splitter 15, and is received by the optical detector 40.

Figure 2:
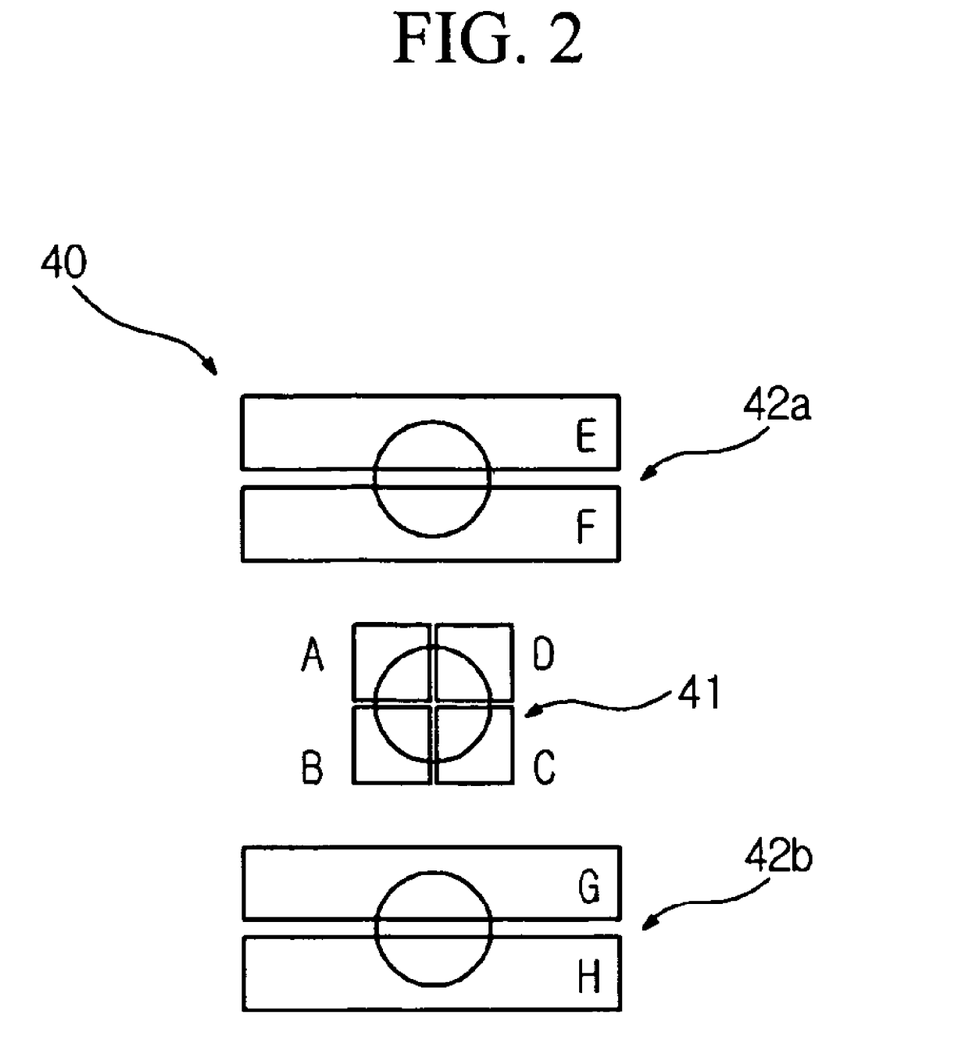
FIG. 2 is a schematic view illustrating an optical detector of the optical pickup device shown in FIG. 1.

FIG. 2 illustrates a structure of the optical detector 40, which detects a tracking error signal by the DPP method.

The optical detector 40 is divided into a main optical detector 41 receiving zero-order light and sub optical detectors 42a and 42b receiving positive and negative first-order light when the light emitted from the light source 10 is branched into at least three beams by the grating 11. The main optical detector 41 may be divided into two regions in a direction (R direction) corresponding to the radial direction of the optical disk 20, and may be divided into two regions in a direction (T direction) corresponding to the tangential direction of the optical disk 20, so as to detect a focus error signal/a tracking error signal. Further, each of the first and second sub optical detectors 42a and 42b may be divided into two regions in the R direction so as to detect a tracking error signal by the DPP method.

When four regions of the main optical detector 41 receiving zero-order light are respectively referred to as A, B, C, and D regions and two regions of the first sub optical detector 42a and two regions of the second sub optical detector 42b receiving positive and negative first-order light are respectively referred to as E, F, G, and H regions, the tracking error signal (TEPdpp) detected by the DPP method is expressed by equation (2).

$$TEPdpp = [(A+D)-(B+C)]-K[(E-F)+(G-H)] \quad (2)$$

In equation (2), K represents a coefficient determined by a ratio of an amount of the positive first-order light to an amount of the zero-order light to an amount of the negative first-order light. For example, when the ratio of the amount of the positive first-order light to the amount of the zero-order light to the amount of the negative first-order light is 1:10:1, K is 10/(1+1)=5.

The ratio of the amount of the positive first-order light to the amount of the zero-order light to the amount of the negative first-order light is set to 1:10:1 because an increase in the amount of the zero-order light is advantageous in terms of optical efficiency in obtaining a reproducing signal from the zero order light.

Where the optical disk 20 is a double layer optical disk as described in the first embodiment, when one of the first layer L1 close to an optical incident plane of the optical disk 20 and the second layer L2 distant from the optical incident plane of the optical disk 20 is recorded/reproduced, the light returned to the optical detector 40 is influenced not only by the layer of the optical disk 20 at which the focus of the object lens 30 is located but also by an adjacent layer of the optical disk 20.

For example, when the first layer L1 close to the optical incident plane of the optical disk 20 is reproduced, zero-order light reflected by the second layer L2 reaches the first and second sub optical detectors 42a and 42b serving to receive the positive and negative first-order light reflected by the first layer L1, thereby influencing a tracking error signal. The reason is that the amount of the zero-order light is much higher than the amount of each of the positive and negative first-order light.

Accordingly, in order to reduce the size of the optical spot formed on the optical disk 20 by the object lens 30 and to prevent the zero-order light reflected by the adjacent layer from influencing the tracking error signal, the object lens 30 concentrating parallel light, having passed through the collimating lens 12, to form the optical spot on the optical disk 20 has diffraction pattern regions partially diffracting or intercepting the light incident upon the object lens 30.

In order to partially diffract or intercept the light incident upon a central portion of the object lens 30, the diffraction pattern regions are formed at the central portion of the object lens 30. The central axis of the diffraction pattern regions may coincide with the optical axis of the object lens 30.

Figure 3A:
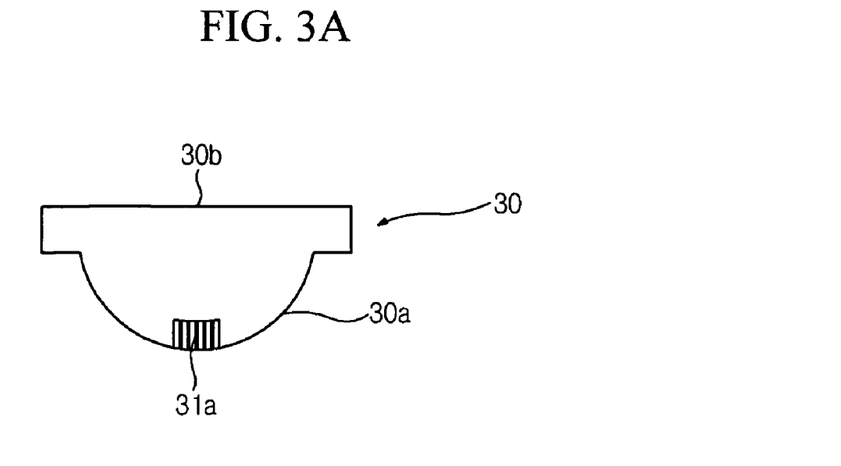
FIGS. 3A, 3B, and 3C are views illustrating various examples of diffraction pattern regions formed on an object lens.
Figure 3B:
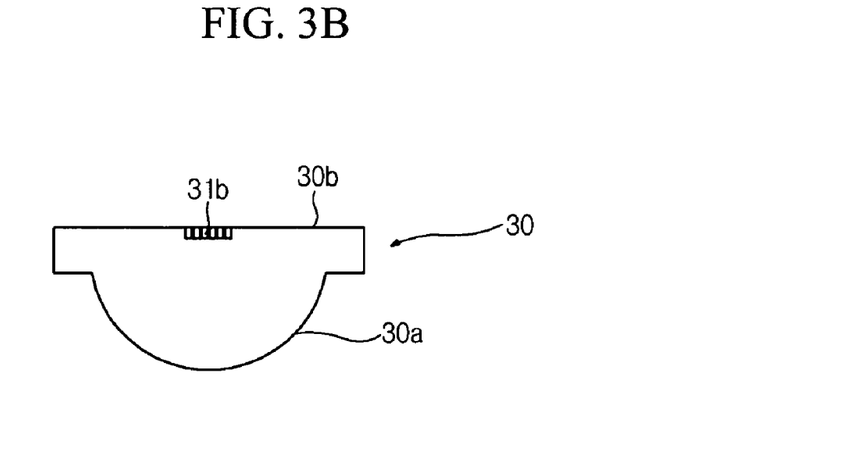
Figure 3C:
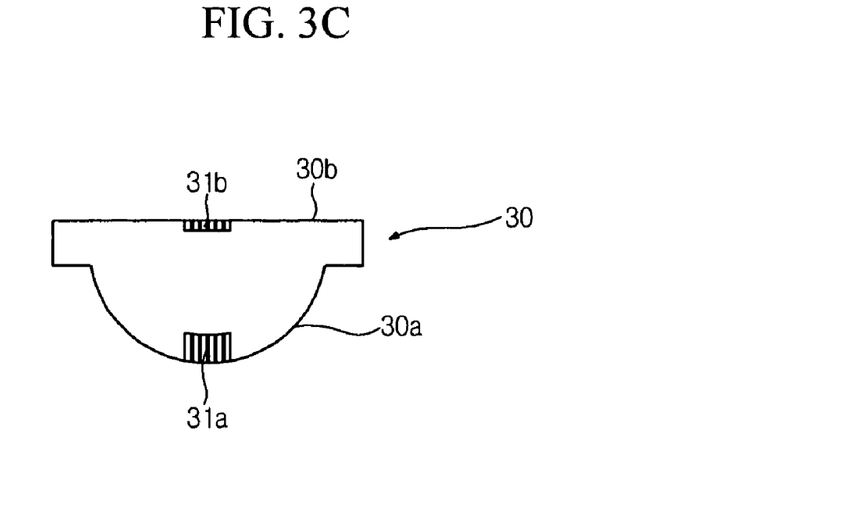

FIGS. 3A, 3B, and 3C illustrate various examples of diffraction pattern regions formed at the central portion of the object lens 30.

FIG. 3A illustrates a diffraction pattern region 31a formed at the central portion of a convex surface 30a of the object lens 30, upon which the light emitted from the light source 10 is incident. FIG. 3B illustrates a diffraction pattern region 31b formed at the central portion of a flat surface 30b of the object lens 30, upon which the light reflected by the optical disk 20 is incident. FIG. 3C illustrates both diffraction pattern regions 31a and 31b formed at the central portions of the convex surface 30a and the plane 30b of the object lens 30.

An operation of the optical pickup device according to the first embodiment when the light source 10 emits P-polarized light will now be described.

The P-polarized light generated and emitted from the light source 10 is diffracted and divided into three beams by the grating 11 so that a tracking error signal can be detected. The three beams pass through the beam splitter 15, and are converted into parallel beams by the collimating lens 12. The three parallel beams are reflected by the reflecting mirror 13, and are directed to the object lens 30. Since the quarter wave plate 14 is placed in front of the object lens 30, the parallel beams are converted to circularly polarized light by the quarter wave plate 14. The circularly polarized light passes through the object lens 30, and form an optical spot on the recording layers L1 and L2 of the optical disk 20. The diffraction pattern regions 31a and 31b, which are formed at the central portion of the object lens 30, partially diffract the light passing through the central portion of the object lens 30.

The partial diffraction of the light passing through the central portion of the object lens 30 partially reduces effective light, which is incident upon the optical disk 20, thereby decreasing the size of the optical spot reaching the diffraction limit, i.e., a size of the optical spot focused by the object lens without aberration.

In the multilayer optical disk 20 having the multiple recording layers L1 and L2, coherent light from an adjacent layer of a target recording/reproducing layer located at the focus of the object lens 30 as well as coherent light from the target recording/reproducing layer is reflected by the optical disk 20, and is incident again upon the flat surface 30b of the object lens 30. Since the diffraction pattern regions 31a and 31b are formed on the object lens 30, the diffraction pattern regions 31a and 31b partially diffract the zero-order light reflected by the adjacent layer overlapping with the zero-order light and the positive and negative first-order light reflected by the target recording/reproducing layer so that the zero-order light reflected by the adjacent layer is received by the first and second sub optical detectors 42a and 42b, thereby preventing the degradation of a tracking error signal due to the coherent light from the adjacent layer.

Further, since the central axis of the diffraction pattern regions 31a and 31b formed on the object lens 20 coincides with the optical axis of the object lens 30, it is possible to prevent a part of the zero-order light reflected by the adjacent layer, having passed through the diffraction patterns 31a and 31b, from being received by the first and second sub optical detectors 42a and 42b.

Figure 4A:
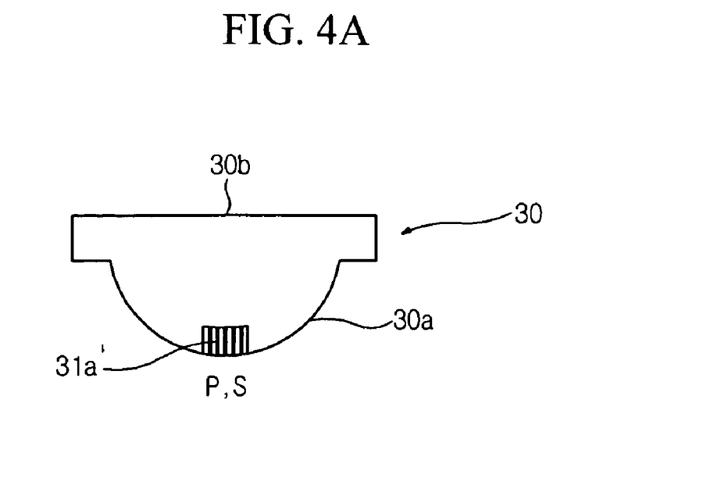
FIGS. 4A, 4B, and 4C are views illustrating various examples of polarized light-intercepting diffraction patterns formed on an object lens.
Figure 4B:
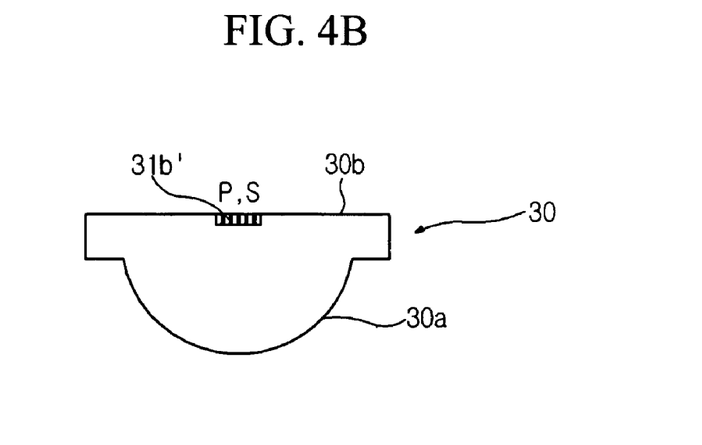
Figure 4C:
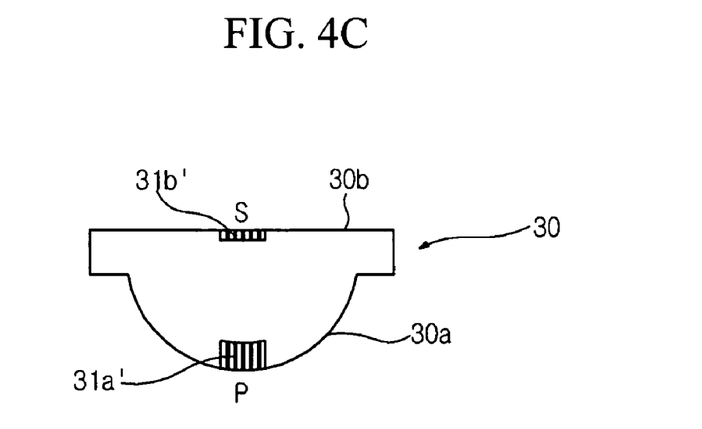

As shown in FIGS. 4A, 4B and 4C, P-polarized and S-polarized light-intercepting diffraction patterns 31a' and 31b' are formed on the diffraction pattern regions 31a and 31b of the object lens 30. Particularly, both the P-polarized and S-polarized light-intercepting diffraction patterns 31a' and 31b' may be formed on one of the convex surface 30a and the flat surface 30b of the object lens 30, or the P-polarized light-intercepting diffraction pattern 31a' may be formed on one of the convex surface 30a and the flat surface 30b and the S-polarized light-intercepting diffraction pattern 31b' may be formed on the other one of the convex surface 30a and the flat surface 30b.

The P-polarized and S-polarized light-intercepting diffraction patterns 31a' and 31b', which are formed at the central portion of the object lens 30, prevent circularly polarized light having characteristics of both P-polarized light and S-polarized light, which passes through the quarter wave plate 14 and is incident upon the object lens 30, from passing through the central portion of the object lens 30. Accordingly, identically with the diffraction pattern regions 31a and 31b partially diffracting the light passing through the central portion of the object lens 30, the P-polarized and S-polarized light-intercepting diffraction patterns 31a' and 31b' can reduce the size of the optical spot. Further, the P-polarized and S-polarized light-intercepting diffraction patterns 31a' and 31b' can partially intercept the zero-order light reflected by the adjacent layer overlapping the zero-order light and the positive and negative first-order light reflected by the target recording/reproducing layer, thereby preventing the degradation of a tracking error signal due to the coherent light.

Figure 5A:
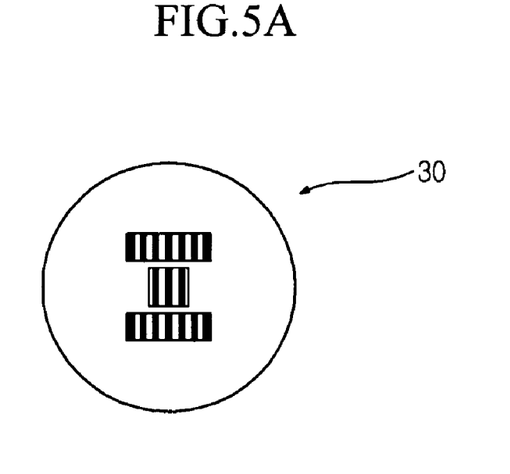
FIGS. 5A, 5B, and 5C are sectional views of object lenses illustrating various shapes of diffraction pattern regions formed thereon.
Figure 5B:
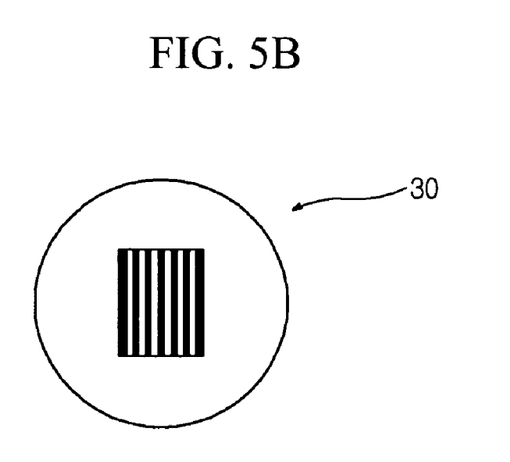
Figure 5C:
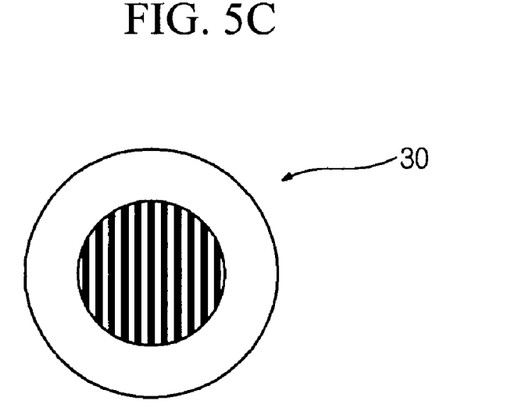

FIGS. 5A, 5B, and 5C are sectional views of the object lenses 30 illustrating various shapes of the diffraction pattern regions 31a and 31b formed thereon partially diffracting or intercepting light incident upon the central portions of the object lenses 30 to reduce the size of the optical spot and prevent the degradation of the tracking error signal.

FIG. 5A illustrates the object lens 30, wherein the diffraction pattern region forms a shape corresponding to a shape of the optical detector 40 having the main optical detector 41 and the first and second sub optical detectors 42a and 42b, such that the zero-order light reflected by the adjacent layer is not received by the main optical detector 41 and the first and second sub optical detectors 42a and 42b.

FIG. 5B illustrates the object lens 30, on which the diffraction pattern region has a rectangular shape, such that the zero-order light reflected by the adjacent layer is not received by the main optical detector 41 and the first and second sub optical detectors 42a and 42b of the optical detector 40.

FIG. 5C illustrates the object lens 30, on which the diffraction pattern region has a size larger than that of the diffraction pattern region of FIG. 5B and a circular shape sufficient to cover the main optical detector 41 and the first and second sub optical detectors 42a and 42b of the optical detector 40, such that the zero-order light reflected by the adjacent layer is not received by the main optical detector 41 and the first and second sub optical detectors 42a and 42b of the optical detector 40. The above large-sized circular diffraction pattern region, which is formed on the object lens 30, can diffract or intercept a larger amount of the light passing through the central portion of the object lens 30 than the diffraction pattern region of FIG. 5B.

Figure 6:
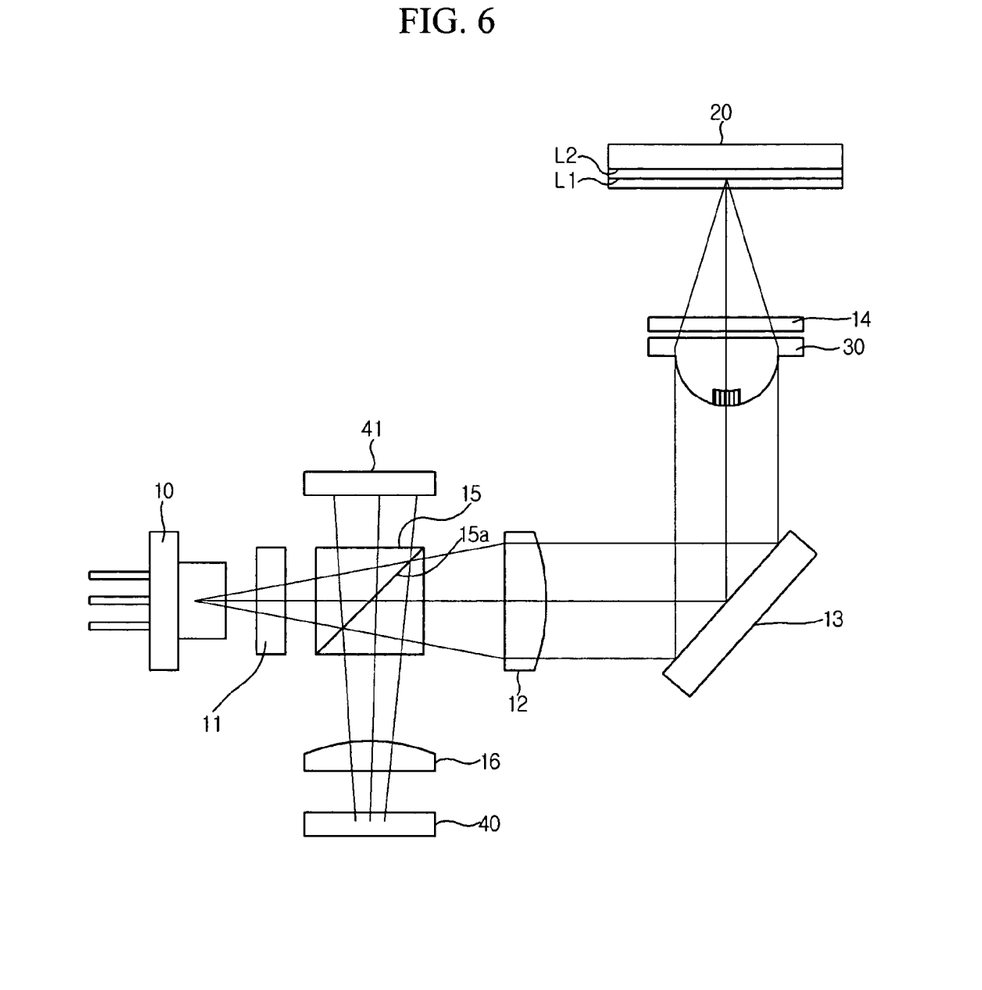
FIG. 6 is a schematic view illustrating an optical system of an optical pickup device in accordance with a second embodiment of the present invention.

FIG. 6 illustrates an optical system of an optical pickup device in accordance with a second embodiment of the present invention. Differing from the optical pickup device shown in FIG. 1, the quarter wave plate 14 of the optical pick up device shown in FIG. 6 is installed on an optical path between the object lens 30 and the optical disk 20 rather than on an optical path between the reflecting mirror 13 and the quarter wave plate 14 as shown in FIG. 1.

Operation of the optical pickup device of the second embodiment when the light source 10 emits P-polarized light will be described.

The P-polarized light generated and emitted from the light source 10 is diffracted and divided into three beams by the grating 11 so that a tracking error signal can be detected. The three beams pass through the beam splitter 15, and are converted into parallel beams by the collimating lens 12. The three parallel beams are reflected by the reflecting mirror 13, and are concentrated by the object lens 30. Since the quarter wave plate 14 is placed between the object lens 30 and the optical disk 20, the parallel beams are converted into circularly polarized light by the quarter wave plate 14. The circularly polarized light passes through the object lens 30, and forms an optical spot on the recording layers L1 and L2 of the optical disk 20. Then, the circularly polarized light is reflected by the recording layers L1 and L2 of the optical disk 20 and is converted into circularly polarized light having an opposite rotating direction, and the circularly polarized light is converted into S-polarized light by the quarter wave plate 14 and is received by the optical detector 40.

Identically with the optical pickup device of the first embodiment, the optical pickup device of the second embodiment comprises diffraction pattern regions, which are formed at the central portion of the object lens 30 so as to reduce the size of the optical spot formed on the optical disk 20 by concentrating the light using the object lens 30 and to prevent the zero-order light reflected by an adjacent layer of a target recording/reproducing layer from influencing a tracking error signal of the target recording/reproducing layer.

The above diffraction pattern regions of the optical pickup device of the second embodiment are the same as those of the optical pickup device of the first embodiment, and will thus be described with reference to FIGS. 3A, 3B and 3C.

FIG. 3A illustrates a diffraction pattern region 31a formed at the central portion of a convex surface 30a of the object lens 30, upon which the light emitted from the light source 10 is incident. FIG. 3B illustrates a diffraction pattern region 31b formed at the central portion of a flat surface 30b of the object lens 30, upon which the light reflected by the optical disk 20 is incident. FIG. 3C illustrates both diffraction pattern regions 31a and 31b formed at the central portions of the convex and flat surfaces 30a and 30b of the object lens 30.

Operation of the second embodiment optical pickup device when the light source 10 emits P-polarized light will now be described.

The P-polarized light generated and emitted from the light source 10 is diffracted and divided into three beams by the grating 11 so that a tracking error signal can be detected. The three beams pass through the beam splitter 15, and are converted into parallel beams by the collimating lens 12. The three parallel beams are reflected by the reflecting mirror 13, and are directed to the object lens 30. Here, the P-polarized light is partially diffracted by the diffraction pattern regions 31a and 31b formed at the central portion of the object lens 30, and is incident upon the optical disk 20. The S-polarized light converted from the P-polarized light, reflected by the optical disk 20, by the quarter wave plate 14 is partially diffracted by the diffraction pattern regions 31a and 31b formed at the central portion of the object lens 30, and is received by the optical detector 40.

As described above, the diffraction pattern regions 31a and 31b partially diffract light passing through the central portion of the object lens 30, thereby reducing the size of the optical spot reaching the diffraction limit. Further, the diffraction pattern regions 31a and 31b partially diffract the zero-order light reflected by an adjacent layer of a target recording/reproducing layer overlapping with the zero-order light and the positive and negative first-order light reflected by the target recording/reproducing layer so that the zero-order light reflected by the adjacent layer is not received by the first and second sub optical detectors 42a and 42b, thereby preventing the degradation of a tracking error signal of the target recording/reproducing layer due to the coherent light reflected by the adjacent layer.

As shown in FIGS. 4A, 4B and 4C, P-polarized and S-polarized light-intercepting diffraction patterns 31a' and 31b' are formed on the diffraction pattern regions 31a and 31b of the object lens 30.

Particularly, both the P-polarized and S-polarized light-intercepting diffraction patterns 31a' and 31b' may be formed on one of the convex surface 30a and the flat surface 30b of the object lens 30, or the P-polarized light-intercepting diffraction pattern 31a' may be formed on one of the convex surface 30a and the flat surface 30b and the S-polarized light-intercepting diffraction pattern 31b' may be formed on the other one of the convex surface 30a and the flat surface 30b.

The P-polarized light incident upon the convex surface 30a of the object lens 30 is partially intercepted by the P-polarized light-intercepting diffraction pattern 31a', thereby reducing the size of the optical spot formed on the optical disk 20. Further, the S-polarized light incident upon the flat surface 30b of the object lens 30 is partially intercepted by the S-polarized light-intercepting diffraction pattern 31b', so that the zero-order light reflected by the adjacent layer is not fully received by the first and second sub optical detectors 42a and 42b, thereby preventing the degradation of a tracking error signal of the target recording/reproducing layer due to the coherent light by the adjacent layer.

The shapes of the diffraction pattern regions 31a' and 31b' of the optical pickup device of the second embodiment are the same as those of the diffraction pattern regions 31a and 31b of the optical pickup device of the first embodiment as shown in FIGS. 5A, 5B, and 5C, and their detailed descriptions will thus be omitted.

As is apparent from the above description, the present invention provides an optical pick up device, in which diffraction pattern regions or polarized light-intercepting diffraction patterns are formed at the central portion of an object lens so that effective light incident upon an optical disk is partially intercepted, thereby reducing the size of an optical spot.

Further, since the diffraction pattern regions or the polarized light-intercepting diffraction patterns are formed at the central portion of the object lens, the central axis of the diffraction pattern regions easily coincides with the optical axis of the object lens. Thereby, it is possible to firmly partially intercept zero-order light reflected by an adjacent layer of a target recording/reproducing layer, thus preventing the degradation of a tracking error signal of the target recording/reproducing layer caused by the reception of the zero-order light by first and second sub optical detectors.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup device comprising:
a light source emitting light at a designated wavelength;
an object lens concentrating the light incident from the light source thereupon and forming an optical spot on an optical disk having multiple recording layers; and
an optical detector receiving the light reflected by the optical disk and detecting a data signal and an error signal,
wherein at least one diffraction pattern region partially diffracting or intercepting the light emitted from the light source and being incident upon the object lens, and the light, reflected by the optical disk and being incident upon the object lens, is formed on the object lens at a central portion of the object lens,
wherein the at least one diffraction pattern region is formed on at least one of a convex surface of the object lens, upon which the light emitted from the light source is incident, and a flat surface of the object lens, upon which the light reflected by the optical disk is incident, and
wherein P-polarized and S-polarized light-intercepting diffraction patterns intercepting both P-polarized light and S-polarized light are formed on the at least one diffraction pattern region.

2. The optical pickup device as set forth in claim 1, wherein a central axis of the at least one diffraction pattern region coincides with an optical axis of the object lens.

3. The optical pickup device as set forth in claim 1, wherein the P-polarized and S-polarized light-intercepting diffraction patterns intercepting both P-polarized light and S-polarized light are formed on one of the convex surface and the flat surface.

4. The optical pickup device as set forth in claim 1, wherein the P-polarized light- intercepting diffraction pattern intercepting P-polarized light is formed on one of the convex surface and the flat surface, and the S-polarized light-intercepting diffraction pattern intercepting S-polarized light is formed on the other one of the convex surface and the flat surface.

5. The optical pickup device as set forth in claim 1, wherein the optical detector comprises a main optical detector receiving zero-order light reflected by the optical disk and first and second sub optical detectors respectively receiving positive and negative first-order light reflected by the optical disk, and detects a tracking error signal by a Differential Push Pull (DPP) method.

6. The optical pickup device as set forth in claim 5, wherein each of the at least one diffraction pattern region forms a shape corresponding to a shape of the main optical detector and the first and second sub optical detectors so that the zero-order light reflected by an adjacent layer of a target recording/reproducing layer of the optical disk is not received by the main optical detector and the first and second sub optical detectors.

7. The optical pickup device as set forth in claim 5, wherein each of the at least one diffraction pattern region has a designated shape so that the zero-order light reflected by an adjacent layer of a target recording/reproducing layer of the optical disk is not received by the main optical detector and the first and second sub optical detectors.

8. The optical pickup device as set forth in claim 7, wherein each of the at least one diffraction pattern region has a circular shape sufficient to cover the main optical detector and the first and second sub optical detectors.

9. The optical pickup device as set forth in claim 1, wherein a quarter wave plate is installed on an optical path between the light source and the object lens.

10. The optical pickup device as set forth in claim 1, wherein a quarter wave plate is installed on an optical path between the object lens and the optical disk.

11. An optical pickup device comprising:
a light source emitting light at a designated wavelength;
a grating branching the light emitted from the light source into zero-order light and positive and negative first-order light;
an object lens concentrating the light incident from the light source thereupon and forming an optical spot on an optical disk having multiple recording layers;
an optical detector receiving the light reflected by the optical disk and detecting a data signal and an error signal; and
at least one diffraction pattern formed on the object lens partially diffracting or intercepting light incident upon the object lens so that a size of an optical spot formed on the optical disk is reduced smaller than a size of the optical spot in the optical diffraction limit and the zero-order light reflected by an adjacent layer of a target recording/reproducing layer of the optical disk does not influence detection regions of the optical detector,
wherein the at least one diffraction pattern region is formed on at least one of a convex surface of the object lens, upon which the light emitted from the light source is incident, and a flat surface of the object lens, upon which the light reflected by the optical disk is incident, and
wherein P-polarized and S-polarized light-intercepting diffraction patterns intercepting both P-polarized light and S-polarized light are formed on the at least one diffraction pattern region.

12. An optical pickup for obtaining a data signal and a tracking error signal from one layer of a multilayered optical disk, the optical pickup device comprising:
an object lens focusing incident zero-order, positive first-order and negative first-order lights polarized in a first circular direction onto the one layer of the multilayer optical disk and gathering zero-order, positive first-order, and negative first-order lights polarized in a second circular direction reflected from the one layer and from a layer adjacent the one layer;
a light source emitting P-polarized laser light having a predetermined wavelength on an optical path toward the object lens;
a grating branching the P-polarized laser light into the incident zero-order, positive first order and the negative first-order lights;
a quarter wave plate converting the P-polarized zero-order, positive first-order and negative first-order lights to be polarized in the first circular direction and converting the reflected zero-order, positive first-order, and negative first-order lights polarized in the second circular direction to S-polarized light; and
an optical detector detecting the data signal from the S-polarized zero-order light and a tracking signal based on the S-polarized zero-order, positive first-order and negative first-order lights; wherein:
the object lens comprises a diffraction pattern partially diffracting or intercepting the zero-order light reflected by the layer adjacent to the one layer of the optical disk,
wherein the at least one diffraction pattern region is formed on at least one of a convex surface of the object lens, upon which the light emitted from the light source is incident, and a flat surface of the object lens, upon which the light reflected by the optical disk is incident, and
wherein P-polarized and S-polarized light-intercepting diffraction patterns intercepting both P-polarized light and S-polarized light are formed on the at least one diffraction pattern region.

13. The optical pickup of claim 12, wherein the diffraction pattern has a shape corresponding to a shape of the optical detector.

14. The optical pickup of claim 12, wherein the diffraction pattern has a rectangular shape.

15. The optical pickup of claim 12, wherein the diffraction pattern has a circular shape.

16. The optical pickup of claim 12, wherein the diffraction pattern is on a surface of the object lens positioned adjacent the optical disk.

17. The optical pickup of claim 16, further comprising a second diffraction pattern on a surface of the object lens opposite the surface positioned adjacent the optical disk.

18. The optical pickup of claim 12, wherein the diffraction pattern is on a surface of the object lens opposite a surface positioned adjacent the optical disk.

19. The optical pickup of claim 12, wherein the quarter wave plate is positioned on an optical path between the light source and the object lens.

20. The optical pickup of claim 12, wherein the quarter wave plate is positioned on an optical path between the object lens and the optical disk.

21. An optical pickup for obtaining a data signal and a tracking error signal from a target layer of a multilayered optical disk, the optical pickup device comprising:
a light source;
an object lens having a diffraction region formed on a surface of the object lens;
a grating disposed between the light source and the object lens;
a quarter wave plate disposed between the object lens and the optical disk; and
an optical detector detecting the data signal and the tracking error signal based on light incident to the optical detector from the optical disk, wherein:
the light source generates P-polarized laser light,
the grating branches the emitted P-polarized light into zero order light, positive first order light and negative first order light components,
the P-polarized light components are partially diffracted by the diffraction pattern region of the object lens and to make the P-polarized light components incident upon the target layer of the optical disk at a reduced spot size, the quarter wave plate converts P-polarized light components reflected from the optical disk to S-polarized light components, and the diffraction region of the object lens partially diffracts the zero-order light component of the converted S-polarized light corresponding to a layer adjacent to the target layer so that the zero order light reflected by the adjacent layer is not incident on the optical detector, wherein the at least one diffraction pattern region is formed on at least one of a convex surface of the object lens, upon which the light emitted from the light source is incident, and a flat surface of the object lens, upon which the light reflected by the optical disk is incident, and wherein P-polarized and S-polarized light-intercepting diffraction patterns intercepting both P-polarized light and S-polarized light are formed on the at least one diffraction pattern region.

22. An optical pickup for obtaining a data signal and a tracking error signal from a target layer of a multilayered optical disk, the optical pickup device comprising:

an optical detector detecting the data signal and the tracking error signal for the target layer based on light received from the optical disk; and an object lens gathering light reflected by the target layer of the optical disk and a layer of the optical disk adjacent the target layer, the object lens having a diffraction region which diffracts first order light reflected by the adjacent layer so that a lesser amount of the first order light reflected by the adjacent layer is included with light reflected by the target layer in the light received by the optical detector, wherein the at least one diffraction pattern region is formed on at least one of a convex surface of the object lens, upon which the light emitted from the light source is incident, and a flat surface of the object lens, upon which the light reflected by the optical disk is incident, and wherein P-polarized and S-polarized light-intercepting diffraction patterns intercepting both P-polarized light and S-polarized light are formed on the at least one diffraction pattern region.

23. The optical pickup of claim 22, wherein:
the diffraction region is formed at a central axis of the objective lens.

24. The optical pickup of claim 22, wherein:
the objective lens comprises a convex surface and a flat surface, and the diffraction region is formed on the flat surface.

25. The optical pickup of claim 22, wherein:
the objective lens comprises a convex surface and a flat surface, and the diffraction region is formed on the convex surface.

26. The optical pickup of claim 25, wherein:
the objective lens further comprises another diffraction region formed on the flat surface.

* * * * *